United States Patent
Nagashima

[11] Patent Number: 6,140,629
[45] Date of Patent: Oct. 31, 2000

[54] IMAGE READING METHOD AND IMAGE READING APPARATUS

[75] Inventor: Kanji Nagashima, Kanagawa, Japan

[73] Assignee: Fuji Photo Film Co., Ltd., Kanagawa, Japan

[21] Appl. No.: 09/059,409

[22] Filed: Apr. 14, 1998

[30] Foreign Application Priority Data

Apr. 14, 1997 [JP] Japan ................................ 9-096229

[51] Int. Cl.[7] .............................. H04N 1/04; H04N 1/40
[52] U.S. Cl. ....................... 250/208.1; 250/234; 358/482
[58] Field of Search ............................. 250/208.1, 208.2, 250/208.3, 205, 234, 235, 214 A, 214 AG; 358/475, 482, 483, 406, 504; 348/229, 362, 364, 376

[56] References Cited

U.S. PATENT DOCUMENTS

| | | | |
|---|---|---|---|
| 4,590,367 | 5/1986 | Ross et al. | 250/205 |
| 4,682,235 | 7/1987 | Chism, Jr. | 348/362 |
| 5,101,275 | 3/1992 | Wijnen | 349/229 |
| 5,739,915 | 4/1998 | Gau et al. | 356/406 |
| 5,767,997 | 6/1998 | Bishop et al. | 359/192 |
| 5,912,724 | 6/1999 | Sakaguchi . | |
| 5,917,546 | 6/1999 | Fukui | 348/296 |
| 5,963,669 | 10/1999 | Wesolkowski et al. . | |
| 5,966,455 | 10/1999 | Saito . | |

FOREIGN PATENT DOCUMENTS

| | | |
|---|---|---|
| 2-76481 | 3/1990 | Japan . |
| 6-217091 | 8/1994 | Japan . |
| 6-233052 | 8/1994 | Japan . |
| 9-312731 | 12/1997 | Japan . |

Primary Examiner—John R. Lee
Attorney, Agent, or Firm—Sughrue, Mion, Zinn, Macpeak & Seas, PLLC

[57] ABSTRACT

A CCD line sensor is adjusted to a dynamic range capable of reliably reading a maximum density (highest density) so as to ascertain the density distribution of an original image (prescan). Next, a pixel which outputs date having a density value higher than a predetermined density threshold value (for example, D=about 2.0 to 2.3 with a maximum density value D as 3 to 3.3) is extracted from image data obtained by one scanning. At the main scanning time, a liquid crystal shutter is operated, transmittance is reduced, and an original image is read only when light is received by the extracted pixel(main scan). An image reading method is provided as mentioned above, and also a scanner for restraining the deterioration of the S/N ratio from the low density area of the original image to the high density area thereof and reliably reading the original image is obtained.

19 Claims, 7 Drawing Sheets

IMAGE READING METHOD AND IMAGE READING APPARATUS

BACKGROUND OF THE INVENTION

1. Field of the Invention

The present invention relates to an image reading method and an image reading apparatus in which light is emitted from a light source to an original and the light transmitted through the original or reflected by the original is converged and received by a solid-state image pickup element in a focal position of this light so as to read the image of the original.

2. Description of the Related Art

When an original image is read by a CCD sensor, generally, the dynamic range of the CCD is adjusted and the density of the original image is detected reliably from the minimum density to the maximum density.

The dynamic range of the CCD sensor is adjusted so that a minimum density portion becomes a maximum output value of the CCD sensor. Thus, it is possible to prevent saturation caused by an excessive light amount and reliably obtain an output value according to the image density.

There is no problem in the minimum density area in such an adjustment of the CCD sensor. However, the output values in the maximum density area (D=3 to 3.3) (wherein D denotes optical density) are 1/1000 to 1/2000 of the maximum output value giving rise to the problem of an unsatisfactory S/N ratio.

In particular, the S/N ratio is even worse in an original image where the negative film has been over-exposed, or in a positive image with a wide density range.

To solve this problem, scanning the original image twice at low and high levels of dynamic range has been considered. However, since the high and low density areas of the image are dispersed, the pixels of a portion of the CCD sensor are saturated and pixels around the saturated pixels are also badly influenced by the saturated pixels so that an output value based on an accurate image cannot be obtained.

SUMMARY OF THE INVENTION

In consideration of the above facts, an object of the present invention is to obtain an image reading method and an image reading apparatus in which the deterioration of the S/N ratio can be restrained from the low density area of an original image to the high density area thereof, and the original image can be reliably read.

A first aspect of the present invention is an image reading method in which light emitted from a light source and transmitted through or reflected by an original is converged and received by a solid-state image pickup element in a focal position of this light so as to read an original image. This image reading method is characterized in that the solid-state image pickup element is adjusted to an unsaturated dynamic range capable of reliably reading a minimum density area in the transmitted or reflected light, and the original image is read by the solid-state image pickup element in the adjusted dynamic range; and a pixel having received an amount of light equal to or greater than a predetermined value is extracted from among the amounts of light read and a transmitted or reflected image of the original image is again read by the solid-state image pickup element by reducing the amount of light received by this extracted pixel in the solid-state image pickup element by a predetermined amount.

A second aspect of the present invention is an image reading apparatus in which light emitted from a light source and transmitted through or reflected by an original is converged and received by a solid-state image pickup element in a focal position of this light so as to read an original image. This image reading apparatus comprises range adjusting means for adjusting the solid-state image pickup element to an unsaturated dynamic range capable of reliably reading a minimum density area in the transmitted or reflected light; preliminary reading means for reading the original image by the solid-state image pickup element in the dynamic range adjusted by the range adjusting means; pixel extracting means for extracting a pixel having received an amount of light equal to or greater than a predetermined value from among the amounts of light read by the preliminary reading means; received light reduction control means for reducing the amount of light received by the pixel extracted by the pixel extracting means in the solid-state image pickup element by a predetermined amount; and main reading means for again reading a transmitted or reflected image of the original image by the solid-state image pickup element after the received light reduction control means has reduced the amount of light received.

In the first and second aspects of the present invention, the minimum density area in the transmitted or reflected light can be first reliably read in the dynamic range of the solid-state image pickup element and the dynamic range is adjusted to an unsaturated range (range adjusting means).

Image data can be obtained in all density regions by reading the transmitted or reflected light by the solid-state image pickup element (preliminary reading means) by this adjustment. Because this reading of all the density areas is similar to the conventional method, naturally the S/N ratio in the maximum density area is unsatisfactory.

Next, a pixel having received an amount of light equal to or greater than a predetermined value is extracted from the image data thus read (pixel extracting means). The extracted pixel is controlled by the solid-state image pickup element, so that the amount of light received is reduced by a predetermined amount (using the received light reduction control means), at the time of the next reading of the transmitted or reflected light (read by the main reading means).

As a result, the difference between the low and high density areas is reduced and the image data can be obtained from the low density area to the high density area without deteriorating the S/N ratio even when the transmitted or reflected light is read (by the main reading means) in one dynamic range.

A third aspect of the present invention is characterized in that the solid-state image pickup element is arranged lineally in the main scanning direction with respect to the original, and the image is scanned and using a one-dimensional image reading element by scanning the image and reading the transmitted or reflected light in a subscanning direction with respect to the original image.

In accordance with the third aspect of the present invention, the solid-state image pickup element is of a so-called line type and the solid-state image pickup elements are arranged in a main scanning direction with respect to the original image. For example, an image of one original can be read by moving the solid-state image pickup element in a subscanning direction relative to the original for every main scanning (reading one line).

In this case, the operation of the received light reduction control means is changed every one line. A liquid crystal shutter corresponding to each pixel is optionally suitable as the received light reduction control means. For example, the liquid crystal shutter may be controlled so that two types of transmission, total transmission and transmission at a predetermined rate (less than 100%), are set, and the predetermined transmission rate is only set at the time a pixel is extracted by the pixel extracting means.

A fourth aspect of the present invention is characterized in that a total three lines in the solid-state image pickup elements are provided for the colors red, green, and blue in the above third aspect of the present invention.

In accordance with the fourth aspect of the present invention, the basic construction of a color image line scanning device is provided, and image data read on each line can be easily synthesized by synchronizing the offset amounts of three line positions and the subscanning movement speed with each other.

Here, when the reduction control of the amount of light received in the minimum density area is performed and the density of only one of the colors is markedly low, the amount of light received of the other colors synthesized later in the same position may be reduced in the same manner. However, in this case, if a color has a markedly high density, the S/N ratio is likely to be deteriorated. Therefore, it is preferable to reduce the amount of light received for each color by providing a different received light reduction control means such as a separate liquid crystal shutter, and the like for every line of each color.

A fifth aspect of the present invention is characterized in that the received light reduction control means controls the amount of light received in one of the above second to fourth aspects of the present invention so that the degree of reduction of the amount of light received is increased in proportion to the amount of light received by each pixel extracted by the pixel extracting means.

In accordance with the fifth aspect of the present invention, the amount of light received by a pixel extracted by the pixel extracting means is not reduced in a uniform ratio. Instead, when the amount of light received by each pixel is low, the degree of reduction of the amount of light received is reduced. In contrast to this, when the amount of light received is high, the degree of reduction of the amount of light received is increased.

Therefore, the inclination of a curve (made a straight line for ease of understanding) showing the relationship between the density and the amount of light received by a pixel, which has been extracted by the pixel extracting means and which has received an amount of light greater than a predetermined value, is shallow in contrast to the inclination of the original curve (straight line) of the density: amount of light received. Thus, the lower the density the more the difference in the amount of light received can be increased.

A sixth aspect of the present invention is characterized in that a pixel which has received the maximum amount of light extracted by said pixel extracting means, and the degree of reduction of the amount of light received by all the pixels is controlled so as to increase, resulting in the extracted pixel being set as the maximum output level in proportion to the amount of light received by each pixel in one of the above second to fourth aspects of the present invention.

In accordance with the sixth aspect of the present invention, the amount of light received by all pixels is reduced by the received light reduction control means. Namely, all the pixels are extracted by the pixel extracting means. However, when the amount of light received by each pixel is low, the degree of reduction of the amount of light received is reduced. In contrast to this, when the amount of light received by each pixel is high, the degree of reduction of the amount of light received is increased.

Accordingly, the inclination of a curve (taken as a straight line for ease of understanding) showing the relationship between the density and the amount of light received by a pixel is shallow in contrast to the inclination of the original curve (straight line) of the density: amount of light received. Thus, the lower the density the more the difference in the amount of light received can be increased. Further, when compared with the above fifth aspect of the present invention, because all the pixels are controlled (received light reduction control), the entire relationship can be given linear characteristics.

A seventh aspect of the present invention is characterized in that the seventh aspect uses a liquid crystal shutter having a cell corresponding to each of the pixels read in the solid-state image pickup element and capable of independently changing transmittance to at least two types of transmittances in one of the above second to fourth aspects of the present invention.

In accordance with the seventh aspect of the present invention, the transmittance of a cell on the liquid crystal shutter side can be independently changed in accordance with each cell on the solid-state image pickup element side. Thus, the amount of light received by each cell on the solid-state image pickup element side can be independently changed.

An eighth aspect of the present invention is characterized in that the liquid crystal shutter can change transmittance to two types of transmittances, namely 100% and from 50% to 60% for every cell in the above seventh aspect of the present invention.

In accordance with the eighth aspect of the present invention, since one of the changeable transmittances of the liquid crystal shutter is 100%, the sensitivity of a CCD sensor can be effectively utilized when the original image is read by the CCD sensor.

When the transmittance is being reduced, then considering the density area of a general photograph image, and the like, the vast majority of images can be read if the transmittance is set to a range from 50% to 60%.

A ninth aspect of the present invention is characterized in that the pixel extracting means extracts a pixel which outputs data having a density value lower than a density threshold value set to a range from about 2.0 to about 2.3 with a maximum density value D as 3 to 3.3 in the above seventh aspect of the present invention.

In the ninth aspect of the present invention, based on the changeable transmittances of the liquid crystal shutter being set to 100% and to between 50% to 60% in the above eighth aspect of the present invention, the density threshold value is set to a range of from about 2.0 to about 2.3 with the maximum density value D as 3 to 3.3, in approximately the same ratio as this ratio of transmittance reduction.

Thus, the maximum density in the solid-state image pickup element can be approximately detected as the maximum amount of light received so that the S/N ratio can be improved.

DESCRIPTION OF THE PREFERRED EMBODIMENTS

Figure 1:
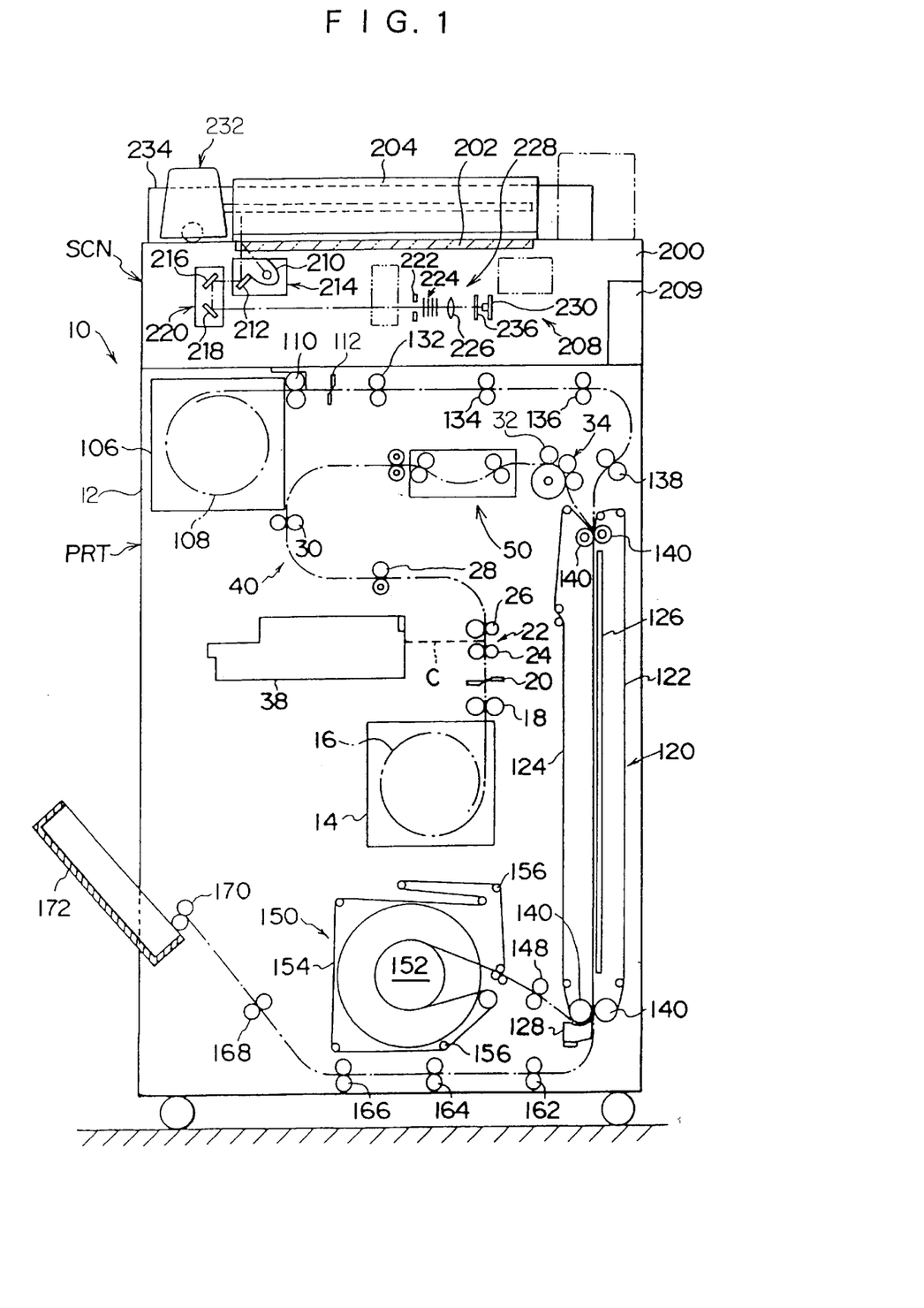
FIG. 1 is a view showing the schematic entire construction of an image reading/recording apparatus in accordance with the present embodiment.

FIG. 1 is a view showing the schematic entire construction of an image reading/recording apparatus 10 in accordance with the present embodiment.

This image reading/recording apparatus 10 is constructed having a scanner portion SCN as an image reading portion and a printer portion PRT for recording an image. The scanner portion SCN is arranged on a chassis 12. The printer portion PRT is arranged within the chassis 12.

(Scanner Portion SCN)

Figure 3:
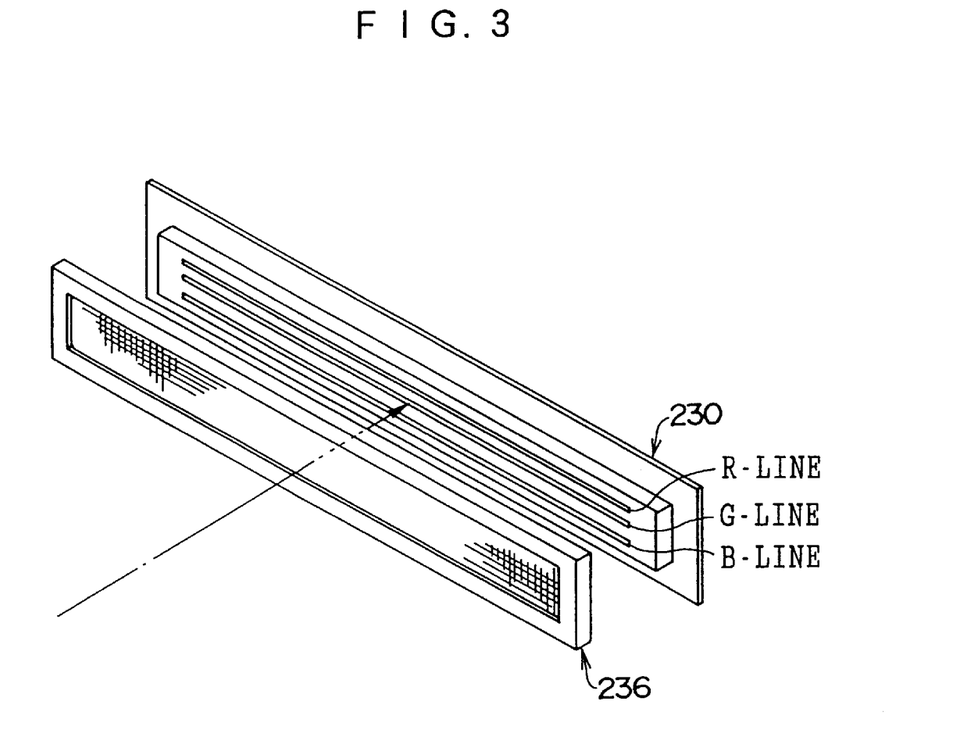
FIG. 3 is a perspective view showing the dispositions of a CCD line sensor and a liquid crystal shutter in accordance with the present embodiment.

FIGS. 1 and 3 show the scanner portion SCN in accordance with the present embodiment.

The scanner portion SCN is covered with a casing 200 of a box type and a rectangular aperture portion is formed in an upper face central portion of the scanner portion SCN. A transparent platen glass 202 is fitted into this aperture portion. The platen glass 202 functions as a planar base for mounting an original and an original having a planar image recorded thereon is mounted on this base facing downward.

A pressing cover 204 is disposed on the platen glass 202 so that the pressing cover 204 can be opened and closed. This pressing cover 204 is fixed to the casing 200 by a hinge on an inside of the casing 200 so that the pressing cover 204 can be rotated around this hinge.

Accordingly, when this press cover 204 is in a closed state, the original can be pressed and held against the platen glass 202 from above.

An unillustrated operation/display panel is disposed on an upper face near side of the casing 200 so that commands for various types functions, and displays of operating states within the device, and the like are performed.

A scanning portion 208 is disposed within the casing 200. Operation of the scanning portion 208 is controlled by a controller 209. This scanning portion 208 is constructed having a light source 210, which is provided with a halogen lamp and a reflector extending in a widthwise direction (the main scanning direction) across the original image. The scanning portion 208 also has a first carriage 214 comprising a first mirror 212, which extends in a widthwise direction across the original image together with the light source 210. The scanning portion 208 also has a second carriage 220 comprising a second mirror 216 and a third mirror 218. Additionally, the scanning portion 208 has a fixing unit 228 constructed having an aperture 222, a group of 4 filters 224 such as color adjusting filters, ND filters, and the like, and an imaging lens 226.

The first carriage 214 performs the function of emitting light from the light source 210 onto the original mounted on a face of the platen glass 202, and deflecting the light (light on a vertical optical axis) reflected from the original by 90° using the first mirror 212, and guiding the light to the second mirror 216 of the second carriage 220.

In the second carriage 220, a reflecting face of the second mirror 216 is opposed to the above described first mirror 212 and is set to be parallel to this first mirror 212. When the second mirror 216 receives light from the first mirror 212, this light is deflected 90° by the second mirror 216 and is further deflected 90° by the third mirror 218.

The light is finally angled so as to be parallel to the face of the platen glass 202 by this third mirror 218 and reaches a light receiving portion of the CCD line sensor 230 via the fixing unit 228. In this fixing unit 228, the amount of light is adjusted by the aperture 222 and the ND filter of the filter group 224. Further, the balance of each color is adjusted by the color adjusting filter of the filter group 224. The original image is focused and formed as an image by the lens 226 on the light receiving face of the CCD line sensor 230.

Here, the first carriage 214 and the second carriage 220 are reciprocated in the subscanning direction along the original surface below the platen glass 202. At this time, the second carriage 220 is moved in the same direction at a conveying speed half that of the first carriage 214 so as to constantly maintain the length of an optical path from a reflecting position of the original to the light receiving portion of the CCD line sensor 230. One reciprocating operation of both the first carriage 214 and the second carriage 220 equates to the scanning of one image (the image is read during the outward journey), accordingly, the original image on the platen glass 202 can be read.

The image data read are recorded in RAM memory, for example, or to a hard disk in a personal computer, and the like connected to the exterior of the image reading/recording apparatus.

A proof light source unit 232 is disposed on an upper face of the casing 200 in such a way that this light source unit 232 is moved in the main scanning direction at a predetermined distance from the platen glass 202. This proof light source unit 232 is used as a light source when a transparent original is mounted on the platen glass 202.

Namely, one end portion (the interior of the unit) of this proof light source unit 232 is connected to a light source unit driving portion 234, and an operation equal to that of the above described first carriage 214 is performed by the driving force of this light source unit driving portion 234.

Here, when the transparent original is scanned, the proof light source unit 232 is operated simultaneously with the first carriage 214. At this time, an image of the transparent original can be obtained by the first mirror 212 by turning-off the light source 210 of the first carriage 214, and turning-on an unillustrated light source inside the proof light source unit 232. Subsequent operations of the light source unit are similar to that for a reflection original.

As shown in FIG. 3, a liquid crystal shutter 236 is disposed in the vicinity and on the upstream side of the CCD line sensor 230. Windows having a pixel number equal to that of the CCD line sensor 230 are provided in this liquid crystal shutter 236. These windows are set so that transmittance can be independently changed to two types of transmittance (for example, 100% transmittance during non-operation and from 50% to 60% transmittance during operation).

The light receiving portion of the CCD line sensor 230 of the present embodiment is constructed having three line sensors each independently detecting the amount of light received for each color (red, green and blue). The liquid crystal shutter 236 is correspondingly arranged having three line sensors.

This liquid crystal shutter 236 performs the function of limiting the amount of light received by a low density portion based on the original image in the CCD line sensor 230. (This low density portion is a high transmittance portion in a transmitted original although the light amount in a negative film is different from that in a positive film. However, this low density portion is a near white portion in a reflected original.) The narrow width of the dynamic range of the CCD line sensor 230 is compensated for by this limitation of the amount of light.

Namely, the scanner portion SCN in the present embodiment performs two scanning operations (two reciprocations) consisting of prescan and main scan.

This is because the width of the dynamic range of the CCD line sensor 230 is narrow, there is overexposure in the transmitted original, and the density area of the original is wide. Accordingly, it is difficult to obtain image data over the whole density range from a low density area to a high density area in one scan.

Therefore, in the present embodiment mode, the dynamic range of the CCD line sensor 230 is adjusted so that the maximum density (highest density) can be reliably read, and the density distribution of the original image ascertained (prescan).

Next, a pixel which outputs data having a density value higher than a predetermined density threshold value (for example, D=about 2.0 to 2.3 with respect to a maximum density value D ranging from 3 to 3.3) is extracted from the image data obtained by one scan. The liquid crystal shutter 236 is operated at a main scanning time only when light from the extracted pixel is received. Thus, the original image is read by reducing the density of the original (main scan).

Figure 5:
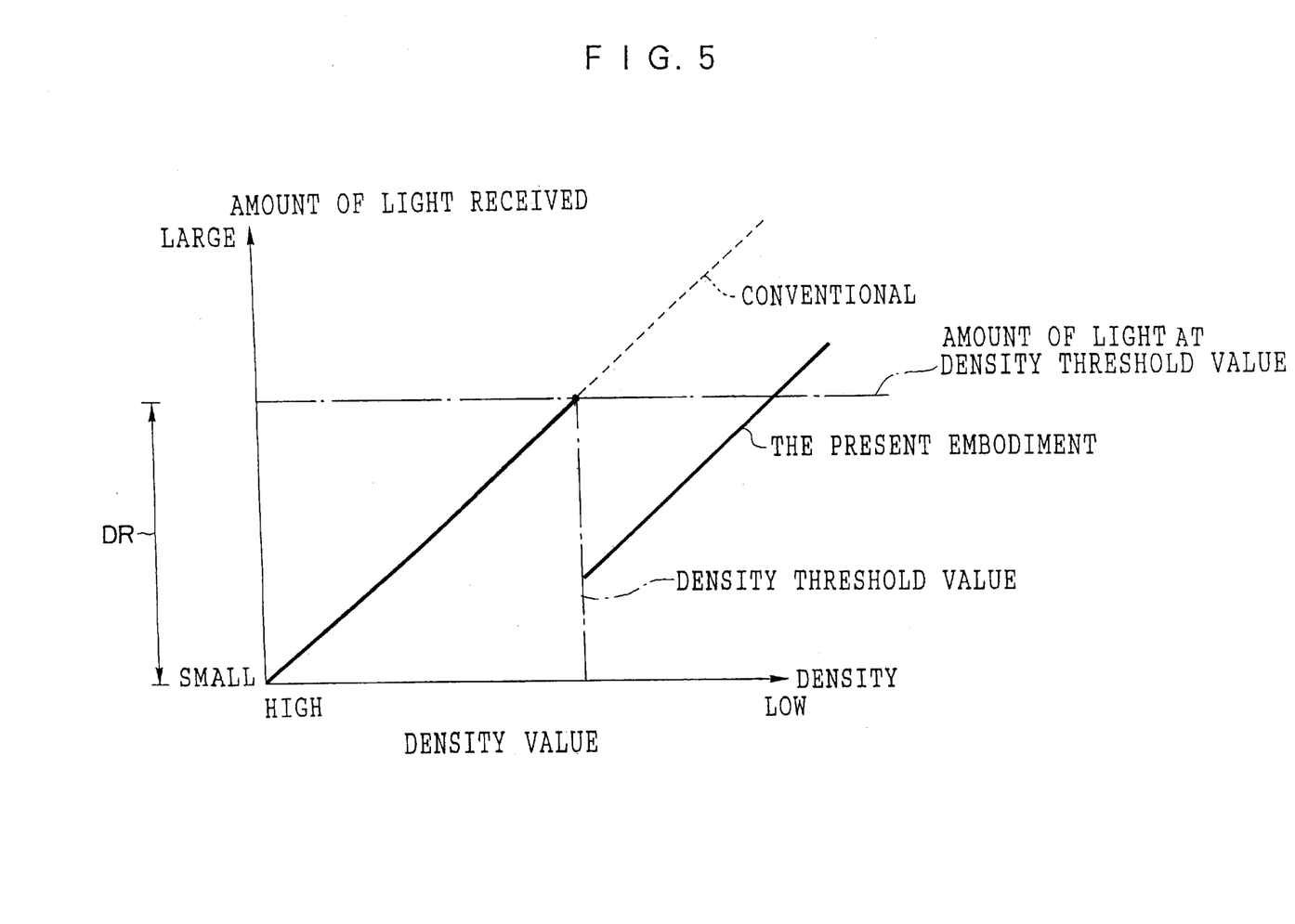
FIG. 5 is a graph of the relationship between the density and the amount of light received by a pixel unit in accordance with the present embodiment.

If the above is expressed as a curved line (shown as a straight line for ease of understanding) showing the relationship between the density and the amount of light received, then the amount of light received by the pixels exceeding the density threshold value is reduced by 50% to 60%, as can be understood from FIG. 5. As a result, in the narrow dynamic range (a range of DR in FIG. 5), detection can be reliably performed in a density area exceeding this dynamic range.

(Printer Portion PRT)

Figure 2:
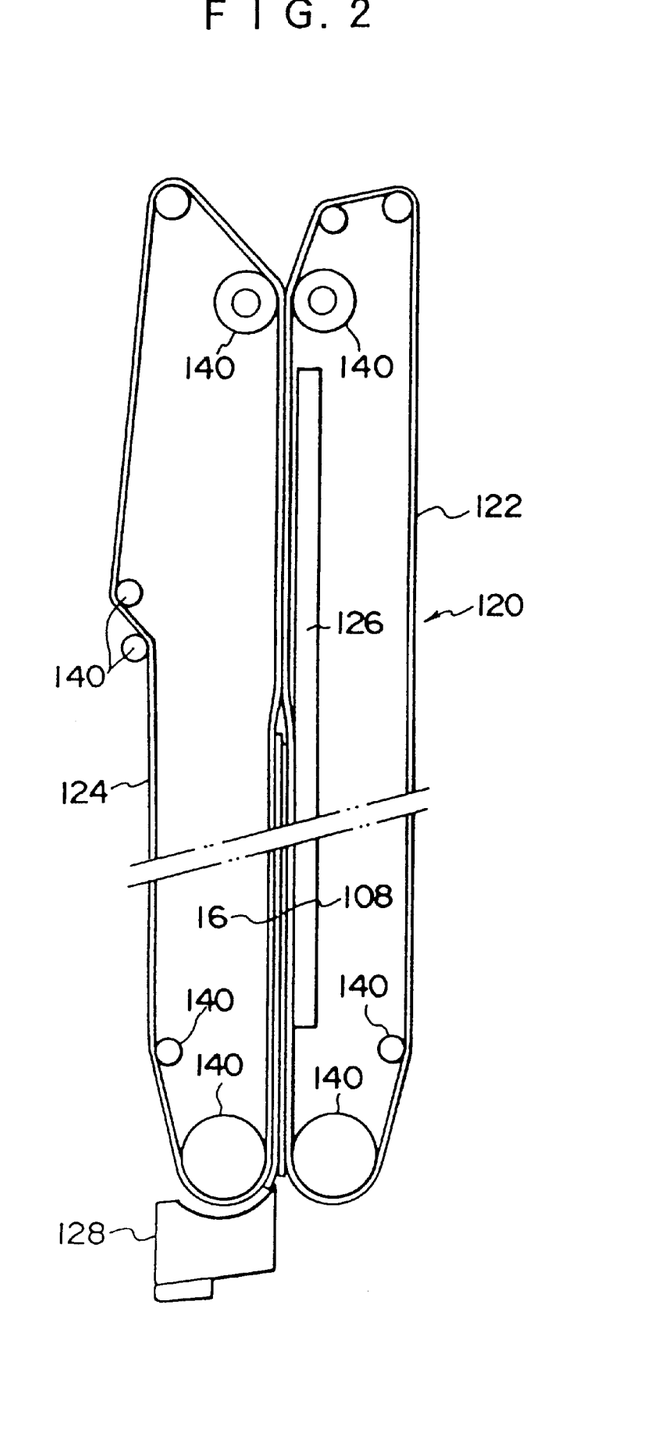
FIG. 2 is an enlarged view of a heat developing transfer portion in accordance with the present embodiment.

FIGS. 1 and 2 show the printer portion PRT inside the chassis 12 of the image reading/recording apparatus 10.

A sensitive material magazine 14 for storing a photosensitive material 16 is disposed inside the chassis 12. This photosensitive material 16 pulled out of the sensitive material magazine 14 is wound around the sensitive material magazine 14 in a roll shape so that a photosensitive (exposure) face of the photosensitive material 16 is directed leftward.

A nip roller 18 and a cutter 20 are disposed in the vicinity of a photosensitive material output port of the sensitive material magazine 14. Accordingly, after the photosensitive material 16 has been pulled out of the sensitive material magazine 14 by a predetermined length it can be cut by the cutter 20. The cutter 20 is a rotary type, for example, constructed having a fixed edge and a moving edge. The moving edge is moved upward and downward by a rotating cam or the like, and engages with the fixed edge so that the cutter 20 can cut the photosensitive material 16.

A plurality of conveying rollers 24, 26, 28, 30, 32, 34 are sequentially disposed on a side of the cutter 20. Unillustrated guide plates are disposed between the respective conveying rollers. The photosensitive material 16 cut to a predetermined length is first conveyed to an exposure portion 22 disposed between conveying rollers 24 and 26.

An exposure unit 38 is arranged on a left-hand side of this exposure portion 22. Three kinds of LDs, a lens unit, a polygon mirror, and a mirror unit are disposed in the exposure unit 38, but are not shown in the drawings. A light beam C is transmitted from the exposure unit 38 to the exposure portion 22 so that the photosensitive material 16 is exposed.

A construction may be used for simultaneously exposing one line of the photosensitive material by arranging LEDs in a main scanning direction without using the construction in which the LDs are scanned by the polygon mirror like a pendulum.

Further, a U-turn portion 40 for curving the photosensitive material 16 in a U-shape and conveying it, and a water coating portion 50 for coating the photosensitive material 16 with an image-forming solvent are provided above the exposure portion 22. In the present embodiment, water is used as the image forming solvent.

The photosensitive material 16, raised from the sensitive material magazine 14, and exposed by the exposure portion 22, is nipped by conveying rollers 28 and 30 and conveyed therebetween. The photosensitive material 16 then passes through a conveying path near an upper side of the U-turn portion 40 as it is sent to the water coating portion 50.

As shown in FIG. 1, a receiving material magazine 106 for storing an image receiving material 108 is disposed in an internal left-hand upper end portion of the chassis 12. An image forming surface of this image receiving material 108 is coated with a dye fixing material having a mordant. The image receiving material 108 is wound around the receiving material magazine 106 in a roll shape so that the image forming surface of the image receiving material 108 pulled out of the receiving material magazine 106 is directed downward.

A nip roller 110 is disposed in the vicinity of an image receiving material output port of the receiving material magazine 106. The nip roller 110 can pull the image receiving material 108 out of the receiving material magazine 106 and can release its nip.

A cutter 112 is disposed on a side of the nip roller 110. Similar to the above cutter 20 for the photosensitive material, the cutter 112 is, for example, a rotary type constructed having a fixed edge and a moving edge. The moving edge is moved upward and downward by a rotating cam or the like and, engages with fixed edge so that the image receiving material 108 pulled out of the receiving material magazine 106 is cut to a length shorter than that of the photosensitive material 16.

Conveying rollers 132, 134, 136, 138 and unillustrated guide plates are disposed on a side of the cutter 112 so that the image receiving material 108 cut to a predetermined length can be conveyed towards the side of a thermal developing transfer portion 120.

As shown in FIGS. 1 and 2, the thermal developing transfer portion 120 has a pair of endless belts 122 and 124 respectively wound around a plurality of winding rollers 140 and extending in a vertical direction and formed in a loop shape. Accordingly, when one of these winding rollers 140 is rotated, the pair of endless belts 122 and 124 wound around these winding rollers 140 are respectively rotated.

A heating plate 126, extending in a vertical direction and formed in the shape of a flat plate, is disposed inside a loop of the endless belt 122 on a right-hand side in each of FIGS. 1 and 2 among the pair of endless belts 122 and 124 in such a way that the heating plate 126 is opposed to a left-hand side inner circumferential portion of the endless belt 122. An unillustrated linear heater is disposed inside this heating plate 126. A surface of the heating plate 126 is raised in temperature by this heater so as to be heated to a predetermined temperature.

Accordingly, the photosensitive material 16 is sent by the final conveying roller 34 on the conveying path to a position between the pair of endless belts 122 and 124 in the thermal developing transfer portion 120. Further, the image receiving material 108 is conveyed simultaneously with the conveyance of the photosensitive material 16. In a state in which the photosensitive material 16 has preceded by a predetermined length, the image receiving material 108 is sent by the final conveying roller 138 in the conveying path to the position between the pair of endless belts 122 and 124 in the thermal developing transfer portion 120, and is then laminated with the photosensitive material 16.

In this case, the image receiving material 108 has a width and a length smaller than those of the photosensitive material 16. Therefore, the photosensitive material 16 is laminated with the image receiving material 108 in a state in which four peripheral portions of the photosensitive material 16 respectively project from four peripheral portions of the image receiving material 108.

Thus, the photosensitive material 16 and the image receiving material 108 laminated by the pair of endless belts 122 and 124 are nipped and conveyed by the pair of endless belts 122, 124 therebetween in a laminated state. Further, when the photosensitive material 16 and the image receiving material 108 laminated with each other are perfectly stored between the pair of endless belts 122 and 124, rotations of the pair of endless belts 122 and 124 are temporarily stopped and the nipped photosensitive material 16 and image receiving material 108 are heated by the heating plate 126. The photosensitive material 16 is heated by the heating plate 126 via the endless belt 122 while being nipped and conveyed and also when stopped. As the photosensitive material 16 is heated, a mobile dye is emitted from the photosensitive material 16 and is simultaneously transferred to a dye fixing layer of the image receiving material 108 so that an image is obtained on the image receiving material 108.

Further, a peeling claw 128 is disposed on the downstream side, from the direction in which the materials are supplied of the pair of endless belts 122 and 124. This peeling claw 128 engages only with the end tip portion of the photosensitive material 16 from among the photosensitive material 16 and the image receiving material 108 which have been nipped and conveyed between the pair of endless belts 122 and 124. Thus, this end tip portion of the photosensitive material 16 projected between the pair of endless belts 122 and 124 can be separated from the image receiving material 108.

A sensitive material discharging roller 148 is disposed on a left-hand side of the separating claw 128 so that the photosensitive material 16 guided by the separating claw 128 and moved leftward can be further conveyed towards the side of the used photosensitive material storing portion 150.

This used photosensitive material storing portion 150 has a drum 152 for winding the photosensitive material 16 therearound, and a belt 154 partially wound around this drum 152. This belt 154 is further wound around a plurality of rollers 156. The belt 154 is turned by rotating these rollers 156 so that the drum 152 is rotated.

Accordingly, when the photosensitive material 16 is sent while the belt 154 is being turned by rotating the rollers 156, the photosensitive material 16 can be collected around the drum 152.

On the other hand, as shown in FIG. 1, receiving material discharging rollers 162, 164, 166, 168, 170 are sequentially arranged in such a way that the image receiving material 108 can be conveyed leftward below the pair of endless belts 122 and 124. The image receiving material 108 discharged from the pair of endless belts 122 and 124 is conveyed by these receiving material discharging rollers 162, 164, 166, 168, 170 and is discharged to a tray 172.

Operation of the image reading apparatus of the present embodiment will next be explained.

First, the reading control of an original image in the scanner portion SCN will be explained in accordance with the flow chart of FIG. 4.

In step 300, a variable n indicating a main scanning line number is set to 1. In the next step 302, it is judged whether the scanning start command has been given or not. Namely, when an original is mounted on the surface of the platen glass 202 and the pressing cover 204 is closed and a start reading command is given by a key operation of an operation/display panel, an affirmative judgment is made in step 302 and the process advances to step 304.

In step 304, the liquid crystal shutter 236 is set to a non-operating state. Namely, in the non-operating state of this liquid crystal shutter 236, all light based on a scanned original image can be transmitted to the CCD line sensor 230 (100% transmittance).

In the next step 306, prescanning is started. The amount of light which reaches the CCD line sensor 230 from a light 214 through a light amount adjustment means 222 and 224, and an imaging lens 226 (or alternatively, from a light through a light amount adjustment means, a document, and an imaging lens), shutter speed adjustment means (not shown), and output signal amplification means of the CCD line sensor 230 (not shown) are adjusted to an unsaturated dynamic range capable of reliably reading a minimum density area. After this adjustment, the light source 210 is turned on in the case of a reflection original and the first carriage 214 and the second carriage 220 begin to operate simultaneously with each other. At this time, the relation between the conveying speed $V_1$ of the first carriage 214 and the conveying speed $V_2$ of the second carriage 220 is set to $V_1=2V_2$. The length of the optical path from the original image surface to the light receiving face of the CCD line sensor 230 can be constantly maintained at any time by maintaining this relation.

Information for each color and information for compressing the dynamic range may be obtained in this prescanning.

When the scanning of one image is completed by such an operation, the process advances from step 306 to step 308. In step 308, a predetermined density threshold value is compared with a density value for each pixel, and a pixel having a density exceeding the density threshold value is extracted.

The prescanning control is performed thus far. The existence of a pixel having a density value exceeding the density threshold value can be recognized by this prescanning.

Next, the main scanning operation is performed. First, in step 310, the liquid crystal shutter 236 is set to the non-operating state. The liquid crystal shutter 236 is not operated at a transfer time from the prescanning. Further, the dynamic range of the CCD line sensor 230 is adjusted from a highest density area to a density threshold value level.

In the next step 312, it is judged whether or not there is an extracted pixel in the main scanning of an n-th line, i.e., a pixel having a density exceeding the density threshold value. When an affirmative judgment is made, the process advances to step 314. In step 314, the liquid crystal shutter 236 is operated and the transmittance of a window corresponding to the extracted pixel is reduced (transmittance from 50% to 60%). In the next step 316, the main scanning of the n-th line is started. In contrast to this, when a denial judgment is made in step 312, the processing in step 314 is not performed. Namely, the process advances to step 316 with the liquid crystal shutter 326 remaining in a non-operational state. Thus, as shown in FIG. 5, an extreme difference is generated in data with the density threshold value as a boundary. Namely, the detection value of a pixel having a density value exceeding the density threshold value can be set so that the amount of light received lies within the dynamic range of the CCD line sensor 230.

In the next step 318, n is incremented and the process advances to step 320. In step 320, it is judged whether the scanning of one image is completed or not. If a denial judgment is made in this step, the process advances to step 310. In contrast to this, if an affirmative judgment is made, the process returns to step 300.

Thus, a pixel having a low density (having received a large amount of light) is extracted in advance during the prescanning and the amount of light received is reduced with this extracted pixel only. Accordingly, an image can be reliably read without deteriorating the S/N ratio in all density areas even when the actual density range is wider than the dynamic range of the CCD line sensor 230.

It is necessary to restore read image data to original image data with respect to the pixel having had its amount of light received reduced. However, the original image data can be easily obtained by making the reverse calculation to that made when the amount of light was reduced.

The read image data is recorded to RAM memory or the hard disk of a personal computer, or the like. After predetermined image processing is performed, the read image data is sent to the printer portion PRT.

In the present embodiment, the liquid crystal shutter 236 is used as a means for reducing the amount of light received is disposed just before the CCD line sensor 230. However, if the original is a transparent original, the liquid crystal shutter may be disposed in an emitting port of the proof light source unit 232 in such a way that the liquid crystal shutter is opposed to the transparent original. Further, the liquid crystal shutter may be provided on a lower face of the platen glass 202. The number of condenser lenses may be increased and a converging point may be provided on an optical path other than the light receiving surface of the CCD line sensor 230, and the liquid crystal shutter may be provided at this converging point.

Further, another control means for reducing the amount of light received such as a micromirror, and the like may be used instead of the liquid crystal shutter 236.

Furthermore, in the present embodiment, the pixel is extracted for each color, but may be extracted on the basis of a synthesized density value of three colors.

Operation of the printer portion PRT will next be explained.

After the sensitive material magazine 14 is set, the nip roller 18 is operated and the photosensitive material 16 is pulled out by the nip roller 18. When the photosensitive material 16 is pulled out by a predetermined length, the cutter 20 is operated so that the photosensitive material 16 is cut to the predetermined length. Further, the photosensitive material 16 is conveyed to the exposure portion 22 with its photosensitive (exposure) surface facing leftward. The exposure unit 38 is operated at the same time as this photosensitive material 16 passes through the exposure portion 22. Thus, an image is scanned and exposed to the photosensitive material 16 located in the exposure portion 22. Image data read by the above-mentioned scanner portion SCN is processed by a personal computer and inputted to the exposure unit 38. The amount of light of the light source is controlled on the basis of this inputted data and the image is scanned and exposed. When a laser (semiconductor laser) is used as the light source, the main scanning is performed by reciprocating the optical axis of a laser beam having the amount of light controlled by duty control as in a pendulum. Subscanning is performed by moving the photosensitive material 16.

When an LED array is used as the light source by arranging LEDs, and the like in the main scanning direction, the amount of light is controlled by controlling the electric current or a voltage of the LED light source so that one main scanning is performed in the same period.

When the exposure is completed, the exposed photosensitive material 16 is sent to the water coating portion 50. The photosensitive material 16 is coated with water as a solvent for image formation in the water coating portion 50, and is then sent by the conveying roller 34 to a position between the pair of endless belts 122 and 124 in the thermal developing transfer portion 120.

On the other hand, as the image is scanned and exposed to the photosensitive material 16, the image receiving material 108 is also pulled out of the receiving material magazine 106 by the nip roller 110 and is conveyed. When the image receiving material 108 is pulled out by a predetermined length, the cutter 112 is operated and cuts the image receiving material 108 to the predetermined length.

After the cutter 112 is operated, the cut image receiving material 108 is conveyed by conveying rollers 132, 134, 136, and 138 while this cut image receiving material 108 is guided by guide plates. When an end tip portion of the image receiving material 108 is nipped by the conveying roller 138, the image receiving material 108 waits on standby just before the thermal developing transfer portion 120.

The conveyance of the image receiving material 108 is restarted as the photosensitive material 16 is sent by the conveying roller 34 to a position between the pair of endless belts 122 and 124 as mentioned above. Thus, the image receiving material 108 is sent to the portion between the pair of endless belts 122 and 124 integrally with the photosensitive material 16.

As a result, the photosensitive material 16 and the image receiving material 108 are laminated with each other. While the photosensitive material 16 and the image receiving material 108 are heated by the heating plate 126, these materials are nipped and conveyed, and then are thermally developed and transferred so that an image is formed on the image receiving material 108.

Further, when these materials are discharged from the pair of endless belts 122 and 124, the separating claw 128 engages with an end tip portion of the photosensitive material 16 which is preceding the image receiving material 108 by a predetermined length. The end tip portion of the photosensitive material 16 is then separated from the image receiving material 108 by this separating claw 128. This photosensitive material 16 is further conveyed by the sensitive material discharging roller 148 and is collected within the used photosensitive material storing portion 150. In this case, since the photosensitive material 16 dries immediately, it is not necessary to further provide a heater or the like for drying the photosensitive material 16.

The image receiving material 108 separated from the photosensitive material 16 is conveyed by the receiving material discharging rollers 162, 164, 166, 168, and 170, and is discharged to the tray 172.

When image recording processing of a plurality of sheets is executed, the above processes are performed sequentially and continuously.

Thus, the thermal developing transfer processing is performed between the pair of endless belts 122 and 124 so that a predetermined image is formed (recorded) on the image receiving material 108. After this image receiving material 108 is discharged from the pair of endless belts 122 and 124, the image receiving material 108 is nipped and conveyed by the plurality of receiving material discharging rollers 162, 164, 166, 168, and 170, and is discharged to the tray 172 outside the apparatus.

MODIFIED EXAMPLE 1

A modified example of the scanning control of the scanner portion SCN in the present embodiment will next be explained.

In the above present embodiment, the density threshold value is set in advance and a pixel having a density exceeding this density threshold value is extracted. The amount of light of this extracted pixel is then reduced at a uniform rate. However, in the modified example 1, a second density threshold value is set at a density level lower than this density threshold value (hereinafter, called a first density threshold value in this modified example 1). The rate at which the amount of light is reduced is increased in accordance with the difference between the first and second density threshold values. The maximum value of the rate at which the amount of light is reduced is set so that the minimum density is equal to the first density threshold value level (or a level slightly lower than this first density threshold value level).

Figure 4:
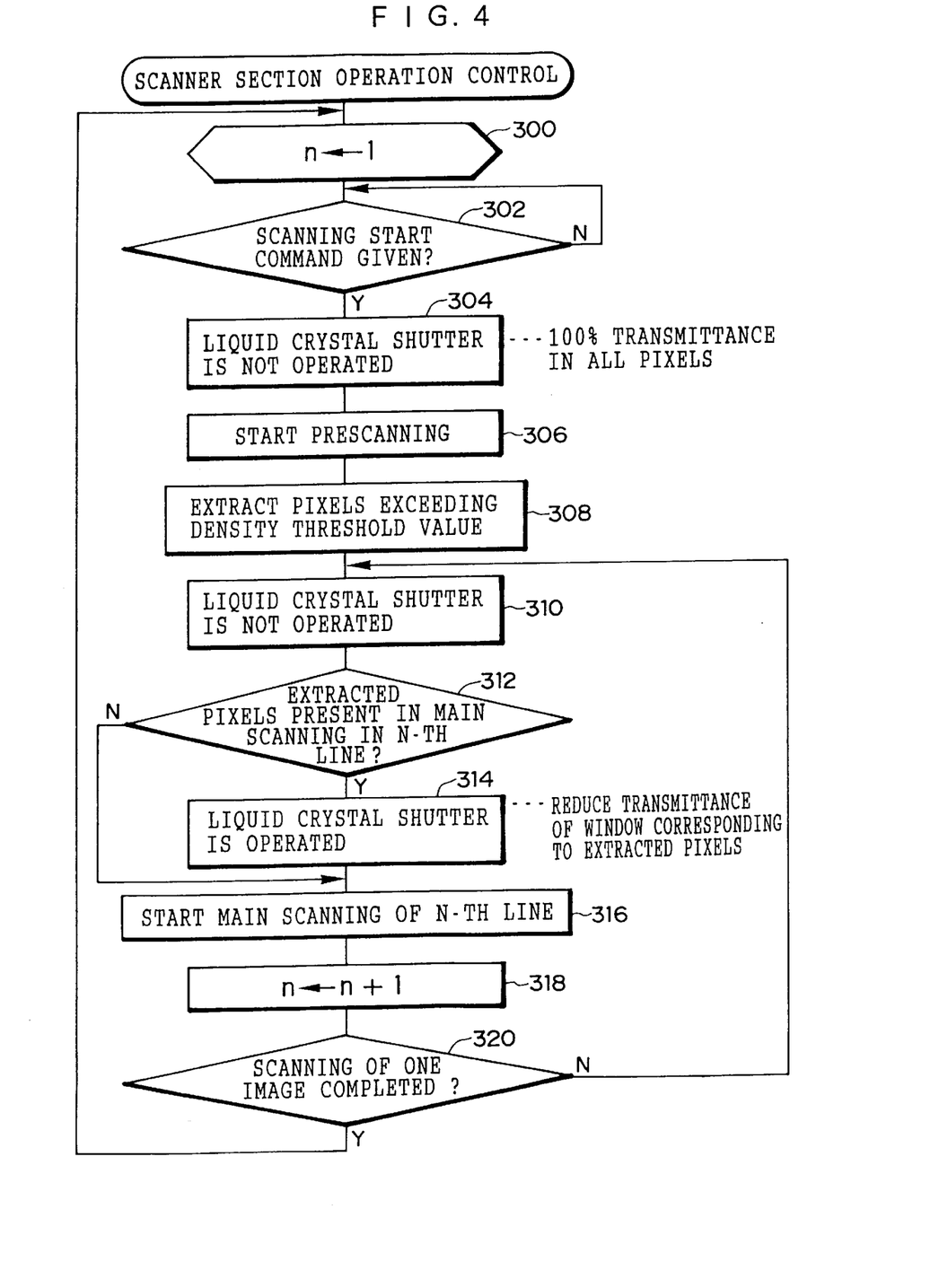
FIG. 4 is a control flow chart showing the reading operation control in accordance with the present embodiment.

The control procedure is approximately the same as that in the flow chart in FIG. 4. However, in the modified example 1, a pixel having a density value exceeding the second density threshold value is extracted and the difference ($\Delta D$) between the density value of the extracted pixel and the second density threshold value is calculated. Further, the ratio ($\Delta D/\Delta Dmax$) of each density difference $\Delta D$ with the maximum density difference $\Delta Dmax$ set as 1 is calculated. Here, the light reduction rate of each pixel with the predetermined light reduction rate (from 50% to 60%) set as 1 is calculated. In accordance with this, the light reduction rate of a pixel having, for example, a density value slightly exceeding the second density threshold value is reduced.

Figure 6:
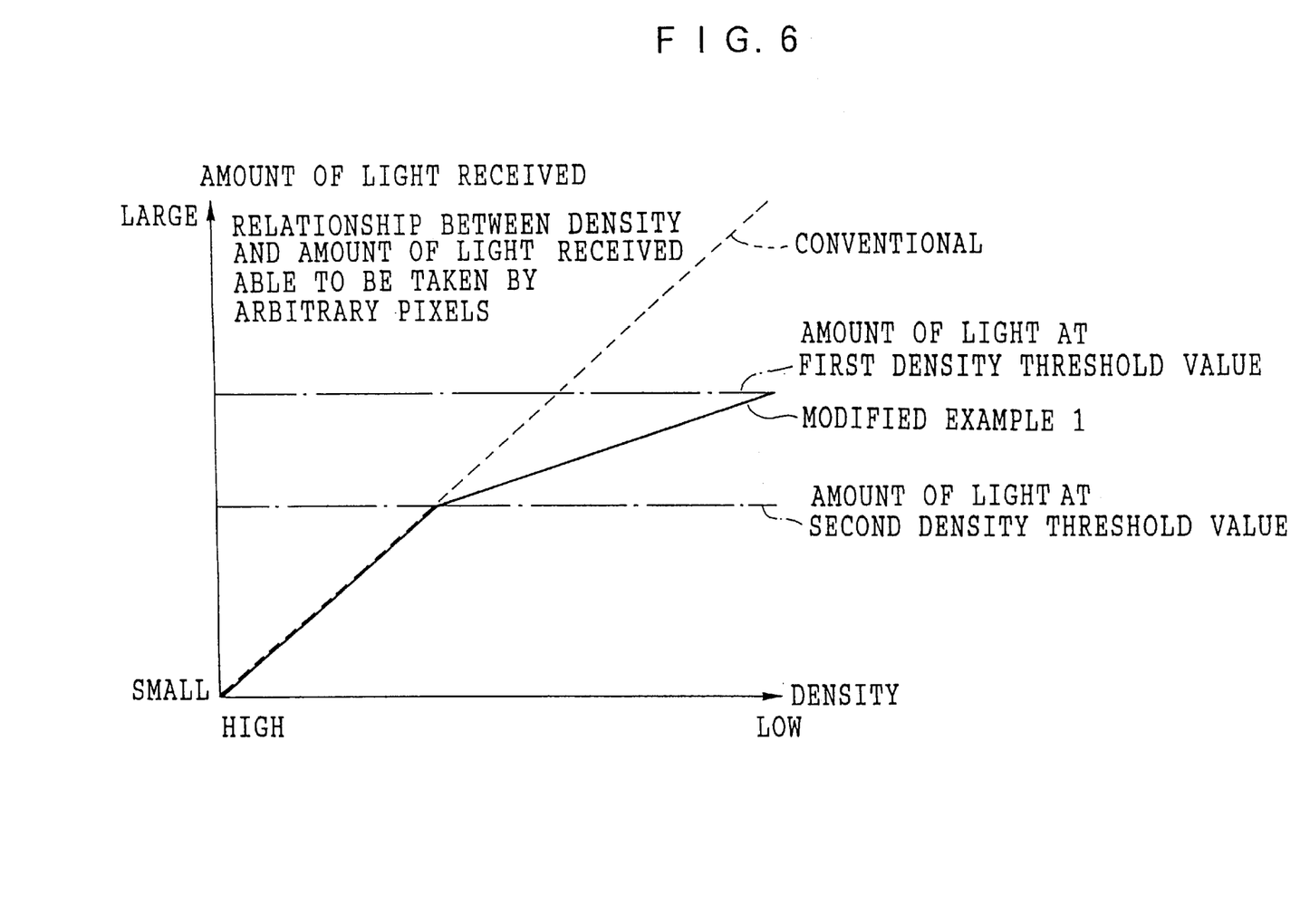
FIG. 6 is a graph of the relationship between the density and the amount of light received by a pixel unit in accordance with a modified example 1.

As a result, as shown in FIG. 6, a pixel having a density value exceeding the second density threshold value has an inclination smaller than that of a pixel having a density value not exceeding the second density threshold value. Accordingly, the density values of all the pixels can be set within the dynamic range of the CCD line sensor 230.

MODIFIED EXAMPLE 2

Figure 7:
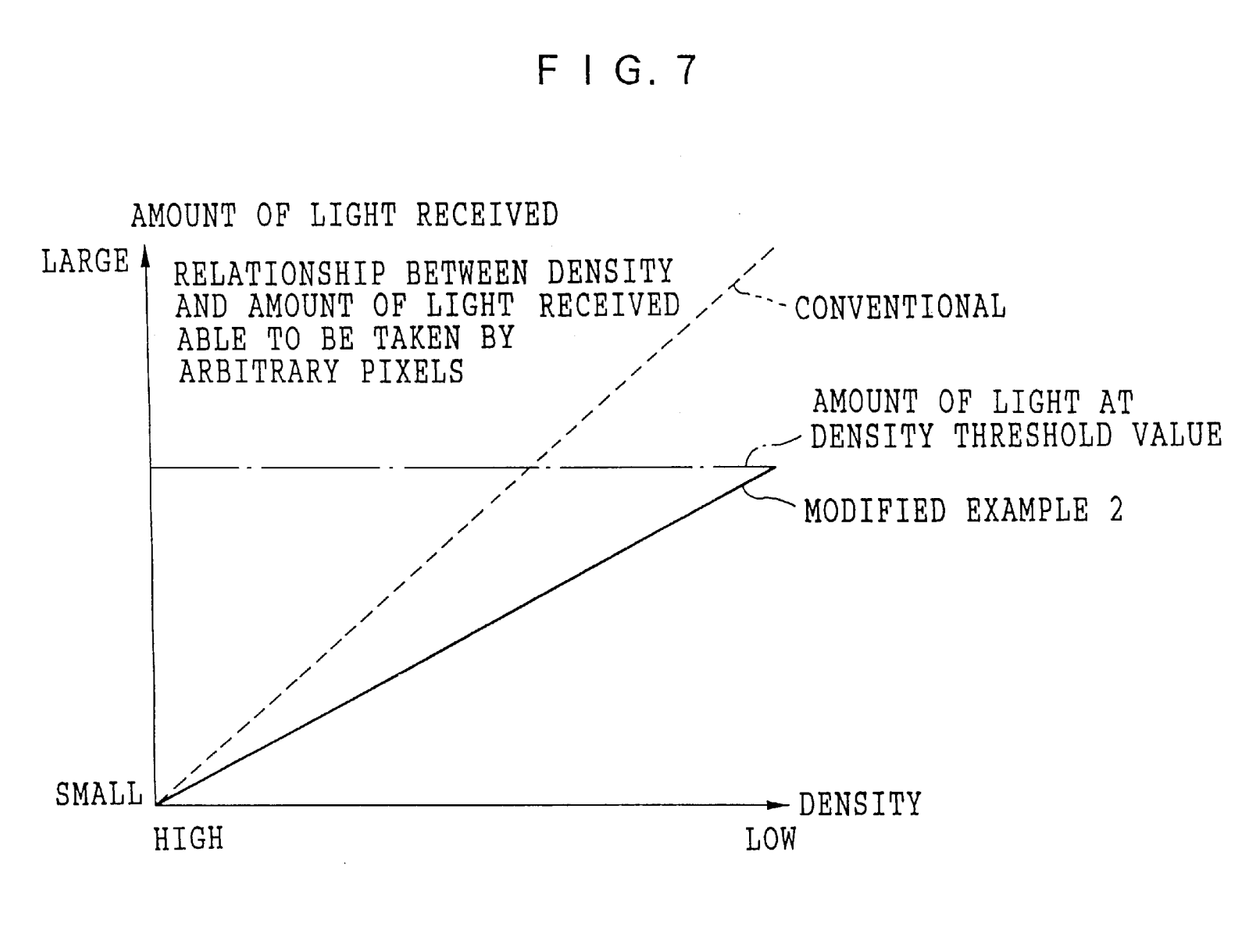
FIG. 7 is a graph of the relationship between the density and the amount of light received by a pixel unit in accordance with a modified example 2.

In this modified example 2, no second density threshold value is set as in the modified example 1, and the rate of reduction of the amount of light received by each pixel is determined by calculating the ratio ($\Delta D/Dmax$) of each density difference $\Delta D$ with the maximum density value Dmax set as 1 with respect to all the pixels. Thus, as shown in FIG. 7, the inclination of the amount of light received is reduced from the point of the lowest amount of light received which is the maximum density value. Accordingly, similar to the modified example 1, the density data of all the pixels can be set within the dynamic range of the CCD line sensor 230.

APPLICATION EXAMPLE

In the present embodiment mode and the modified examples 1 and 2, it is a prerequisite that the amount of light received is reduced and read image data is returned to original image data. However, the reproducibility of the areas of a person's face or the like, which become whitish when photographed by backlight or stroboscope, can be improved by applying the image data as it is without returning it to the original image data. Although, in this case, it is necessary to select the portions not needing to be returned to the original data using a means such as a face extraction means, or the like.

As explained above, in the first and second aspects of the present invention, excellent effects can be obtained in that the deterioration of the S/N ratio is restrained from the low density area of an original image to the high density area thereof and the original image can be reliably read.

In accordance with the third aspect of the present invention, the mechanical construction of a means (received light reduction control means) for adjusting the amount of light received by each pixel to scan an image by each one line can be made compact and simplified.

In accordance with the fourth aspect of the present invention, the amount of light received can be adjusted at the same point of the original image for each color.

In accordance with a fifth aspect of the present invention, the amount of light received by each pixel can be obtained with relatively continuous characteristics without causing any extreme difference in the amount of light received at the boundary between pixels extracted and unextracted by an image extracting means.

In accordance with a sixth aspect of the present invention, the densities of all the pixels are controlled by changing the degree of reduction in accordance with the amount of light received of these pixels. Therefore, the curve of the relationship between the density and the amount of light received becomes linear. Accordingly, it is possible to simplify calculations and the like made when the read image data is returned to the original image data in a subsequent process.

What is claimed is:

1. An image reading method in which light emitted from a light source and one of transmitted through and reflected by an original is converged and received by a solid-state image pickup element in a focal position of said light so as to read an original image;

wherein said solid-state image pickup element is adjusted to an unsaturated dynamic range capable of reliably reading a minimum density area in said one of transmitted and reflected light by a range adjusting means, and the original image is read by said solid-state image pickup element in the adjusted dynamic range; and a single pixel having received an amount of light equal to or greater than a predetermined value is extracted from among light read and one of a transmitted and reflected image of the original image is again read by said solid-state image pickup element by reducing an amount of light received by the extracted pixel in the solid-state image pickup element by a predetermined amount.

2. An image reading apparatus in which light emitted from a light source and one of transmitted through and reflected by an original is converged and received by a solid-state image pickup element in a focal position of said light so as to read an original image, said image reading apparatus comprising:

range adjusting means for adjusting said solid-state image pickup element to an unsaturated dynamic range capable of reliably reading a minimum density area in said one of transmitted and reflected light;

preliminary reading means for reading the original image by said solid-state image pickup element in the dynamic range adjusted by the range adjusting means;

pixel extracting means for extracting a single pixel having received an amount of light equal to or greater than a predetermined value from among the amount of light read by the preliminary reading means;

received light reduction control means for reducing the amount of light received by the pixel extracted by said pixel extracting means in said solid-state image pickup element by a predetermined amount; and main reading means for again reading one of a transmitted and reflected image of the original image by the solid-state image pickup element after the received light reduction control means has reduced the amount of light received.

3. An image reading apparatus according to claim 2, wherein said solid-state image pickup element is arranged linearly in a main scanning direction with respect to the original, and the image is scanned and read using a one-dimensional image reading element by scanning the image and reading the one of transmitted and reflected light in a subscanning direction with respect to the original image.

4. An image reading apparatus according to claim 3, wherein a total three lines in the solid-state image pickup elements are provided for the colors red, green, and blue.

5. An image reading apparatus according to claim 2, wherein said received light reduction control means controls the amount of light received so that a degree of reduction of the amount of light received is increased in proportion to the amount of light received by each pixel extracted by said pixel extracting means.

6. An image reading apparatus according to claim 3, wherein said received light reduction control means controls the amount of light received so that a degree of reduction of the amount of light received is increased in proportion to the amount of light received by each pixel extracted by said pixel extracting means.

7. An image reading apparatus according to claim 4, wherein said received light reduction control means controls the amount of light received so that a degree of reduction of the amount of light received is increased in proportion to the amount of light received by each pixel extracted by said pixel extracting means.

8. An image reading apparatus according to claim 2, wherein a single pixel which has received a maximum amount of light is extracted by said pixel extracting means, and an increase in degree of reduction of the amount of light received by all the pixels is controlled, resulting in the extracted pixel being set as a maximum output level in proportion to the amount of light received by each pixel.

9. An image reading apparatus according to claim 3, wherein a single pixel which has received a maximum amount of light is extracted by said pixel extracting means, and an increase in degree of reduction of the amount of light received by all the pixels is controlled, resulting in the extracted pixel being set as a maximum output level in proportion to the amount of light received by each pixel.

10. An image reading apparatus according to claim 4, wherein a single pixel which has received a maximum amount of light is extracted by said pixel extracting means, and an increase in degree of reduction of the amount of light received by all the pixels is controlled, resulting in the extracted pixel being set as a maximum output level in proportion to the amount of light received by each pixel.

11. An image reading apparatus according to claim 2, wherein said received light reduction control means has a liquid crystal shutter having a cell corresponding to each of the pixels read in the solid-state image pickup element and capable of independently changing transmittance to at least two levels of transmittances.

12. An image reading apparatus according to claim 3, wherein said light receiving reduction control means has a liquid crystal shutter having a cell corresponding to each of the pixels read in the solid-state image pickup element and capable of independently changing transmittance to at least two levels of transmittances.

13. An image reading apparatus according to claim 4, wherein said received light reduction control means has a liquid crystal shutter having a cell corresponding to each or the pixels read in the solid-state image pickup element and capable of independently changing transmittance to at least two levels of transmittances.

14. An image reading apparatus according to claim 11, wherein said liquid crystal shutter can change transmittance to two levels of transmittances, including 100% and from 50% to 60% for every cell.

15. An image reading apparatus according to claim 12, wherein said liquid crystal shutter can change transmittance to two levels of transmittances, including 100% and from 50% to 60% for every cell.

16. An image reading apparatus according to claim 13, wherein said liquid crystal shutter can change transmittance to two levels of transmittances, including 100% and from 50% to 60% for every cell.

17. An image reading apparatus according to claim 14, wherein said pixel extracting means extracts a pixel which outputs data having a density value lower than a density threshold value set to a range of from about 2.0 to about 2.3 with a maximum density value D as 3 to 3.3.

18. An image reading apparatus according to claim 15, wherein said pixel extracting means extracts a pixel which outputs data having a density value lower than a density threshold value set to a range of from about 2.0 to about 2.3 with a maximum density value D as 3 to 3.3.

19. An image reading apparatus according to claim 16, wherein said pixel extracting means extracts a pixel which outputs data having a density value lower than a density threshold value set to a range of from about 2.0 to about 2.3 with a maximum density value D as 3 to 3.3.

* * * * *